Jan. 30, 1951 E. E. FRASER 2,539,736
AUTOMATIC SAFETY SWITCH FOR MOTOR VEHICLES
Filed June 2, 1948 2 Sheets-Sheet 1
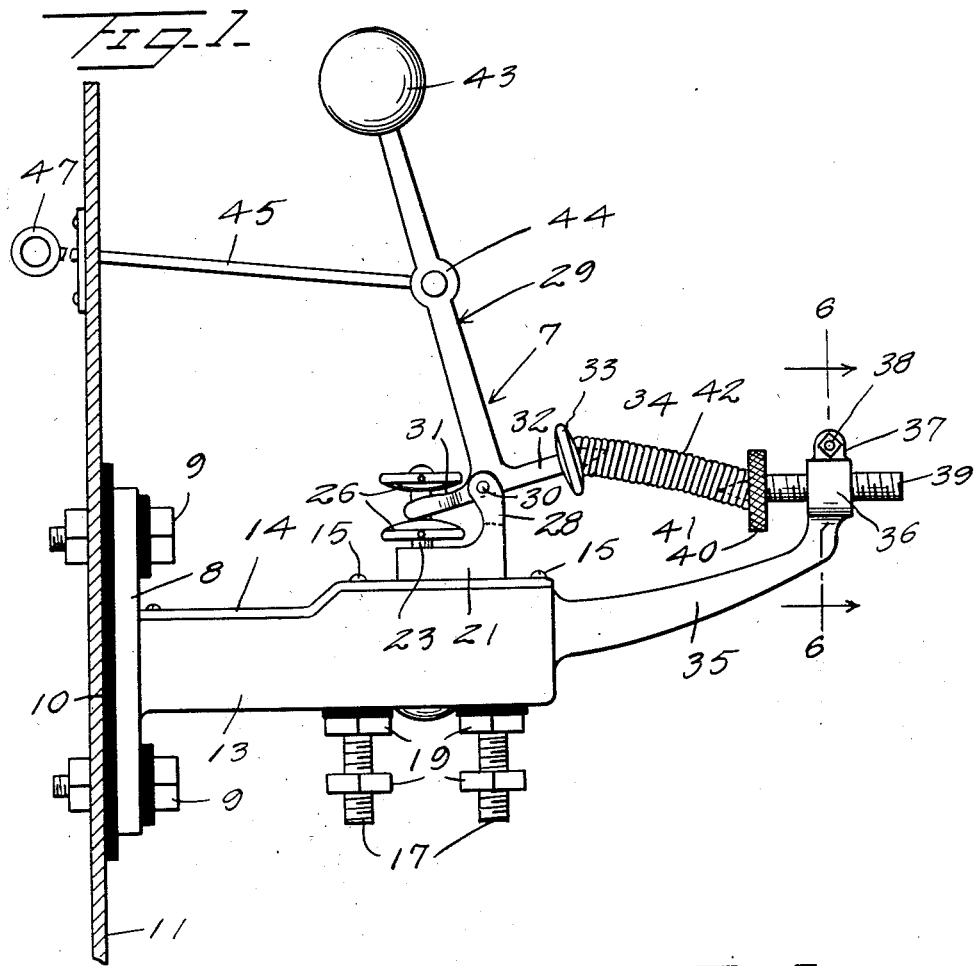
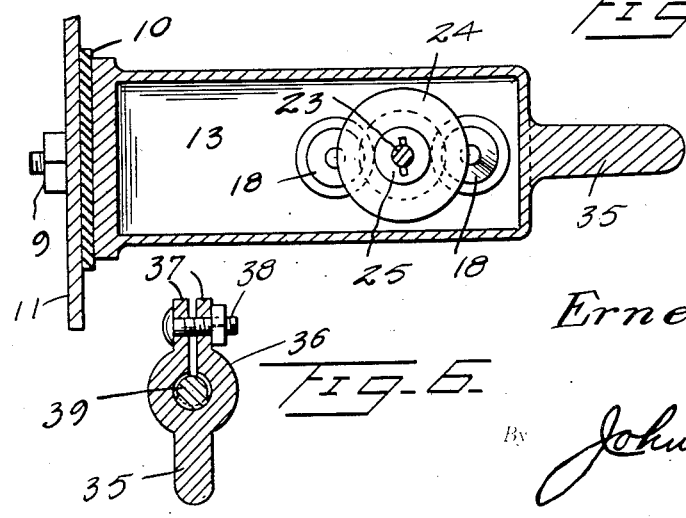
Inventor
Ernest E. Fraser
By John N. Randolph
Attorney

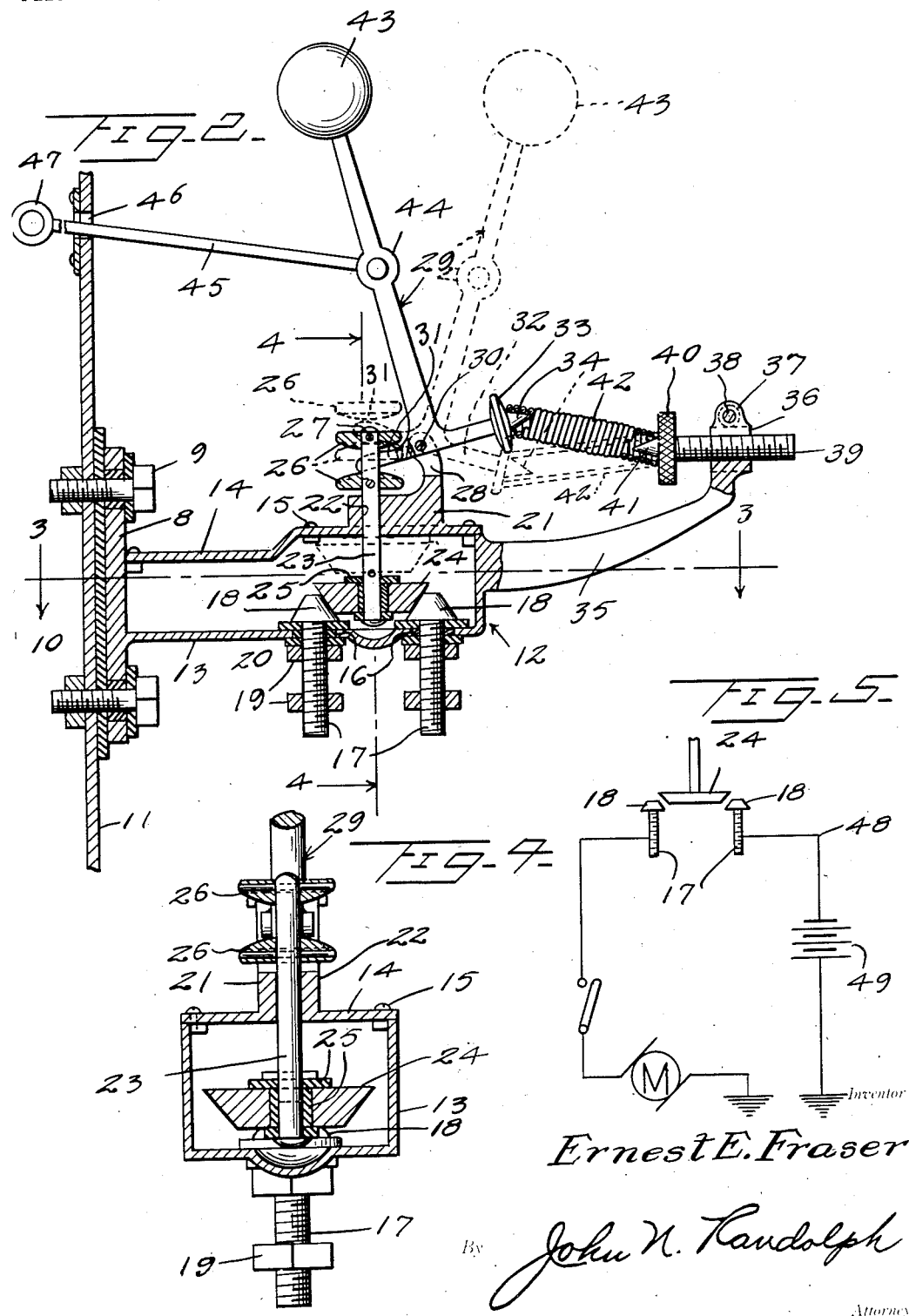

Patented Jan. 30, 1951

2,539,736

UNITED STATES PATENT OFFICE 2,539,736

AUTOMATIC SAFETY SWITCH FOR MOTOR VEHICLES

Ernest E. Fraser, Litchfield, Ill.

Application June 2, 1948, Serial No. 30,690

3 Claims. (Cl. 200—52)

This invention relates to an inertia actuated electric switch for automatically deenergizing the electric system of a motor vehicle in the event of a collision or the striking of an obstruction to prevent the vehicle from catching fire and to automatically stop the engine.

More particularly, it is an object of the present invention to provide a safety switch of extremely simple construction which will effectively function in response to the force of inertia upon sudden stop of the vehicle or which may be manually moved to a circuit interrupting position for readily deenergizing the electric system of a motor vehicle without the necessity of disconnecting a battery cable to thereby eliminate the danger of a short circuit or a mechanic being shocked while working on the vehicle.

Still a further object of the invention is to provide a safety switch having a hand control which can be manually actuated from the driver's seat for energizing or deenergizing the electric system of the vehicle.

Various other objects and advantages of the invention will hereinafter become more fully apparent from the following description of the drawings, illustrating a presently preferred embodiment thereof, and wherein:

Figure 1 is a side elevational view showing the switch in an applied position;

Figure 2 is a vertical sectional view, partly in side elevation of the switch showing the switch in full lines in a circuit closing position;

Figure 3 is a horizontal sectional view of the switch taken substantially along a plane as indicated by the line 3—3 of Figure 2;

Figure 4 is a transverse vertical sectional view taken substantially along a plane as indicated by the line 4—4 of Figure 2;

Figure 5 is a diagrammatic view of a part of the electric system of a motor vehicle showing the switch interposed therein, and Figure 6 is a transverse sectional view taken substantially along a plane as indicated by the line 6—6 of Figure 1.

Referring more specifically to the drawings, the novel inertia actuated safety switch in its entirety is designated generally 7 and includes a bracket 8 which is adapted to be secured by fastenings 9 to the front side of the dashboard of a motor vehicle for positioning the switch 7 beneath the hood of the vehicle. The bracket 8 is preferably insulated from the vehicle by a strip of electrical insulating material 10 which is interposed between said bracket and the dashboard 11.

An arm, designated generally 12 projects outwardly from the bracket 8 and includes a hollow inner portion 13 provided with a removable top cover plate 14 which is detachably retained in an applied position by fastenings 15.

The bottom of the hollow arm portion or housing 13 is provided with longitudinally spaced openings 16 for receiving corresponding contact posts 17 which extend downwardly therethrough. The posts 17 are provided with heads on the upper ends thereof as seen at 18 which are disposed in the housing 13 and which are frustoconical and tapered toward their upper, outer ends. The shanks of the posts 17 are threaded each to receive a pair of nuts 19 and each of said posts carries a flanged insulating washer of suitable electrical insulating material 20 which extends through the opening 16 of said post and which is clamped between the upper nut 19 and the head 18. Said upper nut 19 also functions for detachably clamping the post to the bottom of the housing 13.

The cover 14, above the posts 17 is provided with an external enlargement 21 having a bore extending therethrough as seen at 22 into the housing 13 for reciprocally receiving a rod 23. A frusto-conical bridge member 24 of electrical conducting material is fixed to the lower end of the rod 23 and is electrically insulated therefrom by the insulating washer 25. The upper end of the rod 23 which is disposed above the enlargement 21 has a pair of collars 26 secured thereto in spaced relationship to one another and which collars are provided with adjacent, convex surfaces as best seen in Figure 4. The collars 26 are secured in applied positions by pins 27 which extend therethrough and through the rod 23.

The enlargement 21, at the end thereof remote to the bracket 8, is provided with an upwardly projecting bifurcated extension 28 having apertured furcations. A lever 29 is provided with a crosshead at one end thereof and the portion of the lever which joins with said crosshead is disposed in the bifurcated extension 28 and is apertured to receive a pivot pin 30 which extends therethrough and through the apertures of said furcations for pivotally mounting the lever 29 on the extension 28. One end of the crosshead of the lever 29 constitutes a bifurcated arm 31 which is disposed between the collars 26 and the furcations of which straddle the rod 23. The other arm 32 of said crosshead, which extends in the opposite direction to the arm 31, is provided adjacent its outer end with an enlargement or collar 33 and has a tapered terminal portion 34 disposed therebeyond.

The outer section 35 of the arm 12 which forms an integral extension of the outer end of the housing 13 terminates in an upturned split clamping collar 36 the sections of which are provided with upstanding apertured ears 37 for receiving a nut and bolt fastening 38 for adjustably restricting the bore of said clamping collar 36 which is internally threaded to receive a screw 39. The screw 39 at its inner end is provided with a knurled head 40 and has a tapered extension 41 therebeyond, corresponding to the tapered terminal 34. An expansion coiled spring 42 has one end thereof engaging over the tapered terminal 34 and its opposite end engaging over the tapered extension 41 to yieldably retain the lever 29 in either its full or dotted line position, as seen in Figure 2.

The lever 29 is provided with a weight 43 preferably formed integral with the upper end thereof and intermediate of its ends is provided with an apertured enlargement 44 to which one end of a rod 45 is pivotally connected. The rod 45 extends rearwardly from the lever 29 through an opening 46 in the dashboard 11 and is provided with a handle 47 on its rear end disposed in a position so that it can be manually engaged by the operator of the motor vehicle from the driver's seat for manually swinging the lever 29 to and from its full and dotted line positions.

As illustrated in Figure 5, the two contact posts 17 are adapted to be interposed in the electric system of the motor vehicle on which the safety switch 7 is mounted with said posts preferably being connected to spaced sections of a conductor 48 leading from the positive side of the storage battery 49 or other source of electric power of the vehicle, so that when the contact bridge 24 is out of engagement with the heads 18 of the posts 17 the entire electric system of the vehicle will be de-energized, as illustrated in Figure 5.

From the foregoing it will be readily apparent that the lever 29 will be normally disposed in its full line position of Figure 2 so that the bifurcated arm 31 will be bearing downwardly on the lower collar 26 to hold the conductor bridge 24 in electrical contact with the heads 18 of the posts 17 so that the electrical system of the vehicle will be energized or operative. The spring 42 will exert sufficient force on the lever arm 32 at a point above a line connecting the pivot 30 and the tapered extension 41 so as to readily retain the lever 29 in its full line, circuit energizing position. In moving forwardly, should the vehicle on which the switch 7 is mounted have a collision or strike an obstruction which would cause a sudden stop of the vehicle, the weight 43 through the force of inertia would swing the lever 29 from its full line to its dotted line position of Figure 2 against the action of the spring 42 thereby causing the tapered terminals 34 to swing downwardly to below a line connecting the pivot 30 and tapered extension 41 to cause the spring 42 to yieldably retain the parts in their dotted line positions and so that the bridge 24 is elevated and out of contact with the terminal posts 18 to thereby completely deenergize the electric system of the vehicle to prevent the vehicle from catching fire. The manually actuated rod 45 is of sufficient length to permit this movement of the lever 29 and can be engaged manually for returning the lever 29 to its full line position to re-energize the electric system. Similarly, the actuating rod 45 can be utilized to interrupt the electric circuit when it is desired to work on the vehicle without danger of producing a short circuit or shocking the mechanic, or the lever 29 can be manually engaged beneath the hood for making or breaking the circuit. The screw 39 can be adjusted in the collar 36 to provide the proper tension on the spring 42 after which the fastening 38 is tightened for clamping said screw in its properly adjusted position. The sections of the conductors 38 are preferably clamped to the posts 17 between the nuts 19 carried thereby to provide a secure and positive electrical connection.

Various modifications and changes are contemplated and may obviously be resorted to, without departing from the spirit or scope of the invention as hereinafter defined by the appended claims.

I claim as my invention:

1. An inertia responsive electric circuit interruptor for the electric system of a motor vehicle, comprising a supporting bracket adapted to be mounted on a motor vehicle, a pair of electrical contact posts mounted on the supporting bracket in spaced relationship to one another and electrically insulated from one another and from the supporting bracket, said posts being adapted to be interposed in the electric system of the vehicle, a bridge of electrical conducting material normally engaging both of said posts for completing the electric circuit therebetween, a lever pivotally mounted on said bracket and extending upwardly therefrom and having a weighted upper end, said lever being mounted for swinging movement longitudinally of the vehicle, and means connecting said lever and conductor bridge whereby the lever when in a rearmost position of its swinging movement will retain the bridge in contact with said posts, said lever being swingable forwardly in response to an inertia force for moving said conductor bridge out of contact with said posts for interrupting or deenergizing the electric system, and spring means yieldably retaining a lever at either extremity of its movement for yieldably holding said bridge in either a circuit closing or circuit interrupting position, said spring means acting on the lever to move the lever to either extremity of its movement when the lever is disposed between an intermediate position of its movement and said extremity of movement.

2. An inertia responsive electric circuit interruptor for the electric system of a motor vehicle, comprising a supporting bracket adapted to be mounted on a motor vehicle, a pair of electrical contact posts mounted on the supporting bracket in spaced relationship to one another and electrically insulated from one another and from the supporting bracket, said posts being adapted to be interposed in the electric system of the vehicle, a bridge of electrical conducting material normally engaging both of said posts for completing the electric circuit therebetween, a lever pivotally mounted on said bracket and extending upwardly therefrom and having a weighted upper end, said lever being mounted for swinging movement longitudinally of the vehicle, and means connecting said lever and conductor bridge whereby the lever when in a rearmost position of its swinging movement will retain the bridge in contact with said posts, said lever being swingable forwardly in response to an inertia force for moving said conductor bridge out of contact with said posts for interrupting or deenergizing the electric system, and a snap action spring means yieldably retaining the lever at either extremity of its movement and yieldably urging the lever away from an intermediate position of its movement for yieldably holding said bridge in either a circuit closing or circuit interrupting position.

3. An inertia responsive electric circuit interruptor for the electric system of a motor vehicle, comprising a supporting bracket adapted to be mounted on a motor vehicle, a pair of electrical contact posts mounted on the supporting bracket in spaced relationship to one another and electrically insulated from one another and from the supporting bracket, said posts being adapted to be interposed in the electric system of the vehicle, a bridge of electrical conducting material normally engaging both of said posts for completing the electric circuit therebetween, a lever pivotally mounted on said bracket and extending upwardly therefrom and having a weighted upper end, said lever being mounted for swinging movement longitudinally of the vehicle, and means connecting said lever and conductor bridge whereby the lever when in a rearmost position of its swinging movement will retain the bridge in contact with said posts, said lever being swingable forwardly in response to an inertia force for moving said conductor bridge out of contact with said posts for interrupting or deenergizing the electric system, said bracket having an extension arm at its outer end, a spring perch adjustably clamped in said arm, said lever having a lateral extension forming a second spring perch and extending toward the first mentioned spring perch, and an expansion coiled spring having its ends engaging said spring perches, said second spring perch and the end of the spring engaged thereby being movable across a line joining the pivot of the lever and the first mentioned spring perch whereby said spring will be disposed for yieldably retaining the lever at either extremity of its swinging movement.

ERNEST E. FRASER.

REFERENCES CITED

The following references are of record in the file of this patent:

UNITED STATES PATENTS

| Number | Name | Date |
| --- | --- | --- |
| 1,591,149 | Waltamath | July 6, 1926 |
| 1,868,365 | Paul | July 19, 1932 |
| 2,027,709 | Slebos | Jan. 14, 1936 |
| 2,104,689 | Barker et al. | Jan. 4, 1938 |
| 2,406,427 | Leonard | Aug. 27, 1946 |

FOREIGN PATENTS

| Number | Country | Date |
| --- | --- | --- |
| 702,962 | France | Feb. 2, 1931 |